(12) United States Patent
Kern et al.

(10) Patent No.: US 7,229,581 B2
(45) Date of Patent: Jun. 12, 2007

(54) PROCESS FOR PRODUCING A THERMOPLASTIC FILM USING PLASTIC BOTTLE RECYCLATE

(75) Inventors: Ulrich Kern, Ingelheim (DE); Ursula Murschall, Nierstein (DE); Holger Kliesch, Mainz-Kastel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 431 days.

(21) Appl. No.: 10/702,945

(22) Filed: Nov. 5, 2003

(65) Prior Publication Data

US 2004/0130059 A1 Jul. 8, 2004

(30) Foreign Application Priority Data

Nov. 7, 2002 (DE) .................... 102 51 675

(51) Int. Cl.
*B29C 47/06* (2006.01)
*B29C 47/88* (2006.01)
*B29B 17/00* (2006.01)

(52) U.S. Cl. .............. 264/173.16; 264/210.1; 264/210.7; 264/211.12; 264/235.8; 264/37.32; 264/290.2; 264/911; 264/918; 264/920

(58) Field of Classification Search ........ None
See application file for complete search history.

(56) References Cited

U.S. PATENT DOCUMENTS

| 5,085,933 A | * | 2/1992 | Katoh et al. ............... 428/332 |
| 5,221,719 A | * | 6/1993 | Morris et al. ............... 525/444 |
| 5,225,130 A | * | 7/1993 | Deiringer ................... 264/102 |
| 5,503,790 A | | 4/1996 | Clements ................. 264/176.1 |
| 5,780,128 A | * | 7/1998 | Farha ......................... 428/35.7 |
| 5,902,539 A | * | 5/1999 | Schmidt et al. ............. 264/513 |
| 6,194,536 B1 | * | 2/2001 | Schmidt et al. ............. 528/272 |
| 6,420,019 B1 | * | 7/2002 | Peiffer et al. ............... 428/332 |
| 6,423,401 B2 | * | 7/2002 | Peiffer et al. ............... 428/216 |
| 6,855,435 B2 | * | 2/2005 | Murschall et al. .......... 428/480 |
| 2002/0177686 A1 | * | 11/2002 | Schmidt et al. ............. 528/272 |
| 2003/0171529 A1 | * | 9/2003 | Murschall et al. .......... 528/272 |

FOREIGN PATENT DOCUMENTS

| EP | 0 044 515 A1 | 1/1982 |
| EP | 0 078 633 A1 | 5/1983 |
| EP | 0 483 665 A2 | 5/1992 |
| EP | 1 344 790 A1 | 9/2003 |

OTHER PUBLICATIONS

Sibbing, Engelbert; "Rohstoffbasis für Füllstoffe und Bariumchemikalien" Kunstsoff-Journal 8, No. 10, 30-36 and No. 11, 26-31 (1974).

* cited by examiner

*Primary Examiner*—Christina Johnson
*Assistant Examiner*—Jeff Wollschlager
(74) *Attorney, Agent, or Firm*—ProPat, L.L.C.

(57) ABSTRACT

Invention relates to a process for producing a single-layer or multilayer film by extrusion or coextrusion, biaxial orientation, and heat setting based on crystallizable thermoplastics whose principal constituent is a crystallizable thermoplastic having a standard viscosity SV (DCA) of from 600 to 1000. The thermoplastic is mixed prior to extrusion or coextrusion with 50% by weight (based on the total weight of all thermoplastics) of a secondary thermoplastic having a standard viscosity SV (DCA) of more than 900 to 1500, the standard viscosity SV (DCA) of the two thermoplastics differing by at least 100 units. The secondary thermoplastic is a byproduct or waste product from the production of PET plastic bottles or originates from recycled PET bottles.

17 Claims, No Drawings

PROCESS FOR PRODUCING A THERMOPLASTIC FILM USING PLASTIC BOTTLE RECYCLATE

BACKGROUND OF THE INVENTION

1. Field of the Invention

The invention relates to a process for producing a single-layer or multilayer film by extrusion or coextrusion, biaxial orientation, and heat setting based on crystallizable thermoplastics whose principal constituent is a crystallizable thermoplastic having a standard viscosity SV (DCA) of from 600 to 1 000.

2. Description of the Related Art

Biaxially oriented films of crystallizable thermoplastics are known and numerously described. These films are commonly composed principally of a polyester, production regrind, and additives giving the individual films the desired functionality. The raw materials costs for the polyester, however, are relatively high, and so a search is on for inexpensive alternative starting materials for producing films.

SUMMARY OF THE INVENTION

The object was therefore to provide a process for producing single-layer or multilayer thermoplastic films that is accomplished with more favorably priced materials. The films produced by the process are nevertheless to have the positive properties of the known films. These include, in particular, a high viscosity.

This object is achieved by a process which uses a considerable fraction of a crystallizable thermoplastic having a relatively high viscosity, which arises in the bottle industry as a waste product or byproduct.

DETAILED DESCRIPTION OF THE PREFERRED EMBODIMENTS

The invention accordingly provides a process for producing a single-layer or multilayer film by extrusion or coextrusion, biaxial orientation, and heat setting based on crystallizable thermoplastics whose principal constituent is a crystallizable thermoplastic having a standard viscosity SV (DCA) of from 600 to 1 000, which comprises mixing the thermoplastics, prior to extrusion or coextrusion, with up to less than 50% by weight, based on the total weight of all thermoplastics, of a crystallizable thermoplastic having a standard viscosity SV (DCA) of more than 900 to 1 500, the standard viscosity SV (DCA) of the two thermoplastics differing by at least 100 units.

Principal constituents of both crystallizable thermoplastics in one preferred embodiment are polycondensates of aromatic dicarboxylic acids, especially terephthalic acid, isophthalic acid and/or naphthalene-1,6- or -2,6-dicarboxylic acid, and aliphatic ($C_2$-$C_{10}$)glycols, especially ethylene glycol or cyclohexane-1,4-diyldimethanol. These polycondensates are, in particular, polyethylene terephthalate, polybutylene terephthalate, poly(cyclohexane-1,4-diyl-dimethylene terephthalate), poly(ethylene naphthalate-2,6-dicarboxylate) or polyethylene naphthalate/bibenzoate. The polycondensates generally contain from 100 to 10 000 ppm of stabilizers in cocondensed form.

The crystallizable thermoplastic also termed virgin or primary raw material consists preferably of crystallizable polyester, in particular of crystallizable polyethylene terephthalate, of crystallizable polyethylene naphthalate (PEN) or of a mixture thereof. The thermal degradation behavior of the virgin raw material is optimized when appropriate by cocondensing stabilizers into the polymer chain.

The term "crystallizable polyesters" is intended to denote crystallizable homopolymers and copolymers, crystallizable compounded formulations, crystallizable recyclates, and other variations of crystallizable thermoplastics. The standard viscosity SV (DCA) of the crystallizable thermoplastic used as virgin raw material is generally from 600 to 1 000, preferably from 700 to 980.

The polyesters can be prepared either by the transesterification process (DMT process), with the aid for example of transesterification catalysts such as salts of Zn, Mg, Ca, Mn, Li or Ge, or by the direct esterification process (PTA process), in which various polycondensation catalysts, such as compounds of Sb, Ge, Al or Ti, and phosphorus compounds as stabilizers are used, preference being given to Sb compounds and Ti compounds as polycondensation catalysts.

The copolyesters can contain up to 50 mol %, in particular up to 30 mol %, of comonomer units, in which case a variation in the glycol component and/or in the acid component is possible. Suitable comonomers for the acid component are, for example, 4,4'-bibenzoic acid, adipic acid, glutaric acid, succinic acid, sebacic acid, phthalic acid, 5Na-sulfoisophthalic acid or polyfunctional acids, such as trimellitic acid.

The further crystallizable thermoplastic (also referred to below as secondary raw material thermoplastic or secondary thermoplastic) is obtained especially in the plastic bottle industry as a byproduct or waste product and also as recyclate. It is inexpensive and available in large quantities, but to date has not been used to produce biaxially oriented films. The stated use is likewise new and part of the present invention.

The secondary thermoplastic is used in a fraction of preferably from 5 to 45% by weight, more preferably from 10 to 40% by weight. Appropriately it too is a crystallizable polyester. The standard viscosity SV (DCA) of the secondary thermoplastic is preferably from 1 000 to 1 400, more preferably from 1 050 to 1 300. At a standard viscosity SV (DCA) of more than 1 500, it is common for the film production operation to be accompanied by the development of gels, specks and by reduced filter service times. At viscosities of less than 900 the use of such materials offers no advantages other than that of the relatively low price. The secondary thermoplastic can be used in the form of ground or otherwise comminuted preforms or unused bottles from the bottle industry (preform regrind or else post-industrial pellets) or alternatively in the form of preform regrind which has already been recycled. Plastic bottles which have been cleaned and ground or otherwise adequately comminuted after use (post-consumer material) are likewise suitable as starting material for the process of the invention. All of these materials are significantly more favorably priced than the original polyester raw materials, making the film production operation more economic.

The secondary thermoplastic is preferably added via the regrind circuit; that is, it is mixed with the regrind arising during film production (as a result of trimming and so on) and being recycled into the production operation. The standard viscosity of the regrind is reduced as compared with the virgin raw material. The higher-viscosity secondary raw material, therefore, is appropriately added in an amount such that the viscosity of the mixture corresponds practically to that of the virgin raw material.

The secondary raw material ought to have a copolyester content of less than 10% by weight. Higher copolyester contents can have disruptive effects on film production and/or may negatively influence the properties of the films. It ought also to contain no color additives or pigments, since these have disruptive consequences for the production of transparent and colored films.

The polyester film produced from these raw materials may be single-layer or multilayer. In the multilayer embodiment it is composed of at least one core layer and at least one outer layer, preference being given in particular to a three-layer A-B-A or A-B-C construction. The films produced in accordance with the invention may be symmetrical or asymmetrical in construction, it being possible for different polyesters—possibly including those furnished with additional additives—or polyesters of the same chemical composition but with different molecular weight and different viscosity to be combined by coextrusion.

In the multilayer embodiment the core layer is composed preferably of a mixture of the virgin raw material, regrind and secondary raw material or of a mixture of virgin raw material and regrind, the regrind having been prepared from a mixture of film trimmings obtained as part of the process, and of secondary raw material. The outer layers of the multilayer film can be composed, for example, of polyethylene terephthalate homopolymers, of polyethylene naphthalate homopolymers or of polyethylene terephthalate-polyethylene naphthalate copolymers or compounded formulations.

Base layer and/or outer layer(s) may further comprise further customary additives, such as antiblocking agents, soluble dyes, white pigments and/or chromatic pigments. They are appropriately added to the polymer or to the polymer mixture even before the melting operation.

As additives it is also possible to choose mixtures of two or more different antiblocking agents or mixtures of antiblocking agents of the same composition but different particle size. The particles can be added to the individual layers in the customary concentrations, in the form, for example, of a glycolic dispersion, during the polycondensation or by way of masterbatches during extrusion. Pigment fractions of from 0.0001 to 10.0% by weight, based on the weight of the layers, have proven particularly suitable.

The film can further be UV-stabilized by addition of appropriate additives, made flame retardant, made sealable, coated on one or both sides, stabilized with respect to hydrolysis, treated with antioxidants, chemically pretreated, corona-treated and/or flame-treated.

In one particular embodiment at least one organic white pigment and/or at least one chromatic pigment is added during the production of the film, and then becomes part of the base layer and/or, when appropriate, of the outer layer. The inorganic pigment is preferably introduced by way of masterbatch technology, but can also be incorporated directly at the premises of the raw materials manufacturer. The fraction of the inorganic pigment is generally from 0.2 to 40% by weight, preferably from 0.3 to 25% by weight, based in each case on the weight of the thermoplastic of the layer pigmented.

Suitable white pigments are preferably titanium dioxide, barium sulfate, calcium carbonate, kaolin, and silica, preference being given to titanium dioxide (anatase or rutile) and barium sulfate.

Titanium dioxide of the type described does not produce vacuoles within the polymer matrix during film production.

The titanium dioxide particles, where used, can have a coating of inorganic oxides, such as is normally employed as a coating for $TiO_2$ white pigment in papers or paints in order to improve the lightfastness.

$TiO_2$ is—as is known—photoactive. On exposure to UV radiation, free radicals are formed on the surface of the particles. These free radicals can migrate to the film-forming polymers, leading to degradation reactions and yellowing. Particularly suitable oxides include the oxides of aluminum, silicon, zinc or magnesium or mixtures of two or more of these compounds. $TiO_2$ particles having a coating of two or more of these compounds are described for example in EP-A 0 044 515 and EP-A 0 078 633. The coating may further contain organic compounds having polar and nonpolar groups. The organic compounds must be sufficiently thermally stable during the production of the film by extrusion of the polymer melt. Polar groups are for example —OH; —OR; —COOX; (X=R; H or Na, R=($C_1$-$C_{34}$)alkyl). Preferred organic compounds are alkanols and fatty acids having 8 to 30 carbon atoms in the alkyl moiety, especially fatty acids and primary n-alkanols having 12 to 24 carbon atoms, and also polydiorganosiloxanes and/or polyorganohydrosiloxanes, such as polydimethylsiloxane and polymethylhydrosiloxane.

The coating of titanium dioxide particles is commonly composed of from 1 to 12 g, in particular 2 to 6 g, of inorganic oxides and from 0.5 to 3 g, in particular from 0.7 to 1.5 g, of organic compounds, based in each case on 100 g of titanium dioxide particles. The coating is applied to the particles in aqueous suspension. The inorganic oxides are precipitated from water-soluble compounds, e.g., alkali metal nitrate, especially sodium nitrate, sodium silicate (waterglass) or silica, in the aqueous suspension.

The reference to inorganic oxides such as $Al_2O_3$ or $SiO_2$ also embraces the hydroxides or their various dehydration states such as the oxide hydrate, for example, without their precise composition and structure being known. After calcining and grinding in aqueous suspension, the oxide hydrates of aluminum and/or silicon, for example, are precipitated onto the $TiO_2$ pigment, and the pigments are then washed and dried. This precipitation, therefore, can take place directly in a suspension as obtained in the preparation process after the calcining and subsequent wet grinding. The precipitation of the oxides and/or oxide hydrates of the respective metals takes place from the water-soluble metal salts in the known pH range: for aluminum, for example, aluminum sulfate in aqueous solution (with a pH of less than 4) is used and the oxide hydrate is precipitated by adding aqueous ammonia solution or sodium hydroxide solution in a pH range between 5 and 9, preferably between 7 and 8.5. If starting from a waterglass solution or alkali metal aluminate solution the pH of the initial $TiO_2$ suspension charge should be in the strongly alkaline range (with a pH of more than 8). In that case the precipitation is effected by adding mineral acid such as sulfuric acid in the pH range 5 to 8. After the precipitation of the metal oxides the suspension is stirred for a further period of 15 minutes up to about 2 hours, during which the precipitated layers undergo aging. The coated product is separated from the aqueous dispersion and, after washing at elevated temperature, in particular from 70 to 100° C., is dried.

In another embodiment the preferred pigment is barium sulfate, and in this case the concentration of the pigment is preferably between 0.2% by weight and 40% by weight, in particular between 0.3% by weight and 25% by weight, based on the weight of the crystallizable thermoplastic.

Preferably the barium sulfate as well is added by way of what is termed the masterbatch technology, directly during the production of the film.

In the case of pigmentation with barium sulfate the film further comprises at least one optical brightener, which is used in a fraction of from 10 ppm to 50 000 ppm, preferably from 20 ppm to 30 000 ppm, more preferably from 50 ppm to 25 000 ppm, based in each case on the weight of the crystallizable thermoplastic. It is preferably introduced by way of the masterbatch technology directly during the production of the film. Suitability is possessed by benzoxazole derivatives, triazines, phenylcoumarins, and bisstyrylbiphenyls. Preference is given to using ®Tinopal (Ciba-Geigy, Basle, Switzerland), ®Hostalux KS (Clariant, Germany), and ®Eastobrite OB-1 (Eastman). The optical brightener is able to absorb UV rays in the range from 360 to 380 nm and to emit it again as longer-wave, visible, bluish-violet light.

Besides the optical brightener it is also possible to add soluble blue dyes. Suitable for this purpose are ultramarine blue and anthraquinone dyes, especially Sudan Blue 2 (BASF, Ludwigshafen, Federal Republic of Germany). The blue dyes are used in a fraction of from 10 ppm to 10 000 ppm, preferably from 20 ppm to 5 000 ppm, more preferably from 50 ppm to 1 000 ppm, based in each case on the weight of the crystallizable thermoplastic.

In one preferred embodiment precipitated barium sulfate grades are used. Precipitated barium sulfate is obtained from barium salts and sulfates or sulfuric acid as a finely divided colorless powder whose particle size can be controlled by the precipitation conditions. Precipitated barium sulfates can be prepared by the standard methods, which are described in Kunststoff-Journal 8, No. 10, 30-36 and No. 11, 26-31 (1974). The fraction of barium sulfate is appropriately from 0.2 to 40% by weight, preferably from 0.3 to 25% by weight, more preferably from 1 to 25% by weight, based in each case on the weight of the thermoplastic. The average particle size is relatively low and is preferably in the range from 0.1 to 5 µm, more preferably in the range from 0.2 to 3 µm. The density of the barium sulfate used is between 4 and 5 g/cm$^3$.

In one particularly preferred embodiment the film produced in accordance with the invention comprises as principal constituent a crystallizable polyethylene terephthalate and also from 1% by weight to 25% by weight of precipitated barium sulfate, appropriately having a particle diameter of from 0.4 to 1 µm, particular preference being given to Blanc fixe XR-HX or Blanc fixe HXH from Sachtleben Chemie.

The film produced in accordance with the invention further comprises preferably from 10 to 50 000 ppm of an optical brightener which is soluble in the crystallizable thermoplastic, particular preference being given to triazine-phenylcoumarin (®Tinopal, Ciba-Geigy, Basle, Switzerland), ®Hostalux KS, and ®Eastobrite OB-1 (Eastman).

In a further embodiment the film produced in accordance with the invention may also be given a chromatic coloration. The film of this embodiment can comprise an inorganic color pigment, inorganic black pigments, and organic or inorganic chromatic pigments in the base and/or outer layers. The pigment is preferably introduced by the masterbatch technology but can also be incorporated directly at the premises of the raw materials manufacturer. The fraction of pigment is generally from 0.2 to 40% by weight, preferably from 0.3 to 25% by weight, based in each case on the weight of the crystallizable thermoplastic.

Typical inorganic black pigments are carbon black modifications, which may also be coated, carbon pigments which differ from the carbon black pigments in a higher ash content, and black oxide pigments such as black iron oxide and copper oxide, chromium oxide or iron oxide mixtures (mixed phase pigments).

Suitable inorganic chromatic pigments are oxidic chromatic pigments, hydroxyl-containing pigments, sulfidic pigments, and chromates. Examples of oxidic chromatic pigments are red iron oxide, titanium oxide-nickel oxide-antimony oxide mixed-phase pigments, titanium dioxide-chromium oxide, antimony oxide mixed-phase pigments, mixtures of the oxides of iron, of zinc, and of titanium, chromium oxide, brown iron oxide, spinels of the system cobalt-aluminium-titanium-nickel-zinc oxide, and mixed-phase pigments based on other metal oxides. Typical hydroxyl-containing pigments are, for example, oxide hydroxides of trivalent iron, such as FeOOH. Examples of sulfidic pigments are cadmium sulfide-selenides, cadmium-zinc sulfides, sodium-aluminum silicate containing sulfur bound in the lattice in polysulfide fashion. Examples of chromates are lead chromates, which may be present in monoclinic, rhombic, and tetragonal crystalline forms. All chromatic pigments, like the white pigments and black pigments, can be either uncoated or else carry an organic and/or inorganic coating.

The organic chromatic pigments are generally divided into azo pigments and what are called non-azo pigments. The characteristic of the azo pigments is the azo (—N=N—) group. Azo pigments can be monoazo pigments, disazo pigments, disazo condensation pigments, salts of azo dye acids, and mixtures of the azo pigments.

In a further embodiment the film is colored such that it is transparent. This is generally done using a dye which is soluble in the thermoplastic. The solubility of the dye here is determined in accordance with DIN 55 949. Its fraction is appropriately from 0.01 to 20.0% by weight, preferably from 0.05 to 10.0% by weight, based in each case on the weight of the crystallizable thermoplastic. The transparent coloring of the film is attributable to a wavelength-dependent absorption of the light by the dye present in molecular solution in the thermoplastic. Particularly suitable dyes are those which are soluble in fats or aromatics, examples being azo dyes or anthraquinone dyes. They are particularly suitable for coloring PET, since its high glass transition temperature, $T_g$, limits the migration of the dye. Suitable soluble dyes further include C.I. Solvent Yellow 93 (a pyrazolone derivative), C.I. Solvent Yellow 16 (a fat-soluble azo dye), Fluorol Green Gold (a fluorescent polycyclic dye), C.I. Solvent Red 1 (an azo dye), azo dyes such as thermoplastic red BS, Sudan Red BB, C.I. Solvent Red 138 (an anthraquinone derivative), fluorescent benzopyran dyes, such as Fluorol Red GK and Fluorol Orange GK, C.I. Solvent Blue 35 (an anthraquinone dye), C.I. Solvent Blue 15:1 (a phthalocyanine dye), and mixtures thereof. The coloring with the soluble dyes is referred to as transparent, diaphanous or translucent.

The soluble dyes are preferably introduced via masterbatch technology during film production but can also be incorporated actually during the preparation of the raw material. The fraction of the soluble dyes is generally from 0.01 to 40.0% by weight, preferably from 0.05 to 25.0% by weight, based in each case on the weight of the crystallizable thermoplastic.

The drying of the polymers used and the extrusion operation result in a reduction in the viscosity of the polymer. The viscosity of the regrind used in the production operation, which is produced from in-process film trimmings in a downstream extrusion step, is by its nature lower, owing to the additional extrusion step, than the viscosity of the virgin raw material employed.

Consequently, in the course of subsequent re-use, there may be fluctuations in viscosity which reduce the processing stability. In the case of the process of the invention this is prevented by adding to the film trimmings in the regrinding operation precisely that amount of high-viscosity secondary thermoplastic that is needed to raise the viscosity to the initial level again. When this amount is added to the regrind circuit, the optimum fraction of the second thermoplastic can easily be calculated from the following formula:

Secondary thermoplastic=$((SV_{VR}+\Delta_R-SV_{TR})/(SV_{FL}-SV_{TR}))*100$, where $SV_{VR}$=average SV of all raw materials in accordance with virgin raw material $\Delta_R$=reduction in SV as a result of extrusion step during regrind $SV_{TR}$=SV of the trimmings used or SV of the film produced $SV_{FL}$=SV of the secondary thermoplastic.

As a result of the use of an inexpensive high-viscosity raw material component, moreover, it is possible to achieve a marked increase in the regrind fraction during the production of such films, for which the regenerate fraction is otherwise limited owing to the large reduction in viscosity in the course of processing.

Surprisingly the secondary thermoplastic can be used in a fraction of up to less than 50% by weight, based on the total weight of all thermoplastics, without occurrence of gelling or the appearance of gel specks or other surface defects. Equally surprising is that the filter service lives remain unaffected as compared with conventional film recipes.

In the course of its production the film can be oriented outstandingly and without tearing, in both the machine and transverse directions. The oriented (i.e., stretched) film generally has a thickness of from 0.9 to 500 μm, preferably from 5 to 350 μm, more preferably from 10 to 300 μm.

If the secondary thermoplastic is used in a fraction of from 20% up to less than 50% by weight it is possible for there to be initially a deterioration in the mechanical properties. By adapting the processing parameters, in particular the draw ratios and the drawing temperatures, however, the desired properties can be re-established.

Accordingly the good mechanical properties include a high elasticity modulus (in longitudinal direction=machine direction (MD) greater than 3200 N/mm$^2$, preferably greater than 3500 N/mm$^2$; in transverse direction (TD) greater than 3500 N/mm$^2$, preferably greater than 3800 N/mm$^2$; each determined in accordance with ISO 527-1-2), and also good tensile strength figures (in MD more than 100 N/mm$^2$; in TD more than 130 N/mm$^2$).

The secondary thermoplastic often includes a certain percentage of isophthalic acid (IPA), which can adversely affect the long-term thermal stability of the PET film. For films which are required to have a high long-term thermal stability the use of from 2% to a maximum of 25% by weight of IPA-containing secondary thermoplastic is sensible.

In addition it was more than surprising that the films produced lend themselves outstandingly to thermoforming without additional additives. Thermoformability means that the film can be thermoformed on standard commercial thermoforming machines without uneconomic drying beforehand, to form moldings which are complex and of high surface area.

The polyester films can be produced by known processes, where appropriate with further raw materials and/or further customary additives in usual amounts (from 0.1 to 30% by weight, based on the weight of the film) in the form of either single-layer or multilayer, optionally coextruded, films having identical or differently formed surfaces, with one surface, for example, comprising particles and the other not or with all layers comprising particles. It is likewise possible for one or both surfaces of the film to be provided with a functional coating by known processes.

The secondary thermoplastic, like the virgin raw material, ought to have been precrystallized or subjected to initial drying. This initial drying comprises a gradual heating preferably under reduced pressure (from 20 to 80 mbar, preferably from 30 to 60 mbar, in particular from 40 to 50 mbar) and with stirring and, if desired, a subsequent drying at constant, elevated temperature, likewise preferably under reduced pressure. The polymers are preferably introduced batchwise into a vacuum dryer, preferably at room temperature from a metering vessel in the desired blend with, where appropriate, different raw material components, and said vacuum dryer runs in the course of the drying time or residence time through a temperature spectrum from 10° C. to 160° C., preferably from 20° C. to 150° C., in particular from 30° C. to 130° C. During the residence time, which runs to about 6, preferably 5, in particular 4 hours, the raw material mixture is stirred at from 10 to 70 rpm, preferably from 15 to 65 rpm, in particular from 20 to 60 rpm. The raw material mixture precrystallized or predried produced in this way is afterdried in a downstream vessel, likewise evacuated, at from 90° C. to 180° C., preferably from 100° C. to 170° C., in particular from 110° C. to 160° C., for from 2 to 8 hours, preferably from 2 to 7 hours, in particular from 4 to 6 hours.

In the case of the preferred extrusion process for producing the film, the melted polymer material is extruded together with the additives through a slot die and is quenched in the form of a substantially amorphous prefilm on a chill roll. This film is subsequently heated again and stretched in the machine and transverse directions or in transverse and machine directions or in machine direction, in transverse direction and again in machine direction and/or transverse direction. The stretching temperatures are generally from $T_g$+10° C. to $T_g$+60° C. ($T_g$=glass transition temperature of the film); the longitudinal stretching ratio is normally from 2 to 6, in particular from 3 to 4.5, that of the transverse stretching is from 2 to 5, in particular from 3 to 4.5, and that of the second longitudinal and transverse stretching, where carried out, is from 1.1 to 5. The first longitudinal stretching can be carried out, where appropriate, simultaneously with the transverse stretching (simultaneous stretching). Subsequently the film is heat-set at oven temperatures of from 180 to 260° C., in particular from 220 to 250° C. After that the film is cooled and wound.

It was surprising that by the initial drying or precrystallization it was possible to produce a film having the required profile of properties and to do so economically and without sticking in the dryer. The yellowness index of the film was also not adversely affected as compared with that of a conventionally produced film, within the bounds of measurement accuracy.

Furthermore it was surprising that the regrind as well can be used again without adversely affecting the yellowness index of the film.

Through the combination of excellent properties the film produced in accordance with the invention is outstandingly suitable for a multiplicity of different applications: for example, for cable insulation and engine insulation, thermal transfer films, interior panelling, exhibition construction and exhibition articles, as displays, for signs, protective glazing of machinery and vehicles, in the lighting sector, in shop fitting and shelving, as advertising articles or as a laminating medium, and many others.

Where the materials employed meet the prevailing statutory provisions, the films produced from them can also be employed as packaging material even in the food sector.

All of the films specified are recyclable without problems and particularly without polluting the environment.

The individual properties were measured in accordance with the following standards/methods:

Yellowness Index

The yellowness index (YI) is the deviation from colorlessness in the "yellow" direction and was measured in accordance with DIN 6167.

Light Transmittance (Transparency)

Light transmittance is the ratio of total light transmitted to the amount of incident light.

Haze

Haze is that percentage fraction of the transmitted light which deviates by more than 2.5° from the incident light beam on average. Distinctness of image was determined at an angle of less than 2.5°.

Light transmission and haze were measured using the ®HAZEGARD plus instrument (from Byk Gardner, Germany) in accordance with ASTM D 1003.

Surface Defects

The surface defects were determined visually.

Long-term Thermal Stability

The long-term thermal stability was measured in accordance with IEC216. Instead of the tearing force whose use is recommended in the standard, 2% elongation at break was chosen as the failure criterion here. The chosen temperatures for thermal conditioning were 150° C., 160° C., 170° C., and 180° C.

Mechanical Properties

The elasticity modulus and the tensile strength were measured in the machine and transverse directions in accordance with ISO 527-1-2.

Standard Viscosity (SV) and Intrinsic Viscosity (IV):

The standard viscosity SV was measured in accordance with DIN 53726 in the form of a 1% strength solution in dichloroacetic acid (DCA) at 25° C. SV (DCA)=$(\eta_{rel}-1)\times$ 1000. The intrinsic viscosity (IV) was calculated as follows from the standard viscosity:

$$IV(DCA)=6.67\times10^{-4}SV(DCA)+0.118$$

EXAMPLES

The invention is illustrated below with reference to inventive and comparative examples. Described therein is the production of single-layer or multilayer films of different thickness on an extrusion line. Percentages are by weight, unless specified otherwise or obvious from the context.

Example 1

A white monofilm 190 µm thick was produced from:
34% M04 (clear PET polymer from KoSa, Germany, having an SV of 980),
6% masterbatch containing PET+4% by weight titanium dioxide and 3% by weight calcium carbonate and having an SV of 810,
60% regrind consisting of 60% of in-process film trimmings and 40% of bottle recyclate (post-industrial, PET-A, Texplast, Germany) having an SV of 1200.

The film trimmings used had an SV of 850, giving a calculated mixture SV of 990 for the material used, prior to regrind. As a result of the extrusion step during regrind the SV of the mixture fell by 40 units to an SV of 950, giving the regrind an SV approximately the same as that of the sum of the virgin raw materials.

The film produced in accordance with this recipe had an SV of approximately 850.

The overall yield in the production of this film (i.e., the fraction of saleable film to extrudate employed) was 64%; in other words, 36% of the extrudate were again obtained as trimmings. Under these conditions the raw material cycle was closed (60% regrind with 60% trimmings fraction corresponds to a total trimmings fraction of 36%).

Example 2

A monofilm 4.5 µm thick was produced from:
20% RT49 (clear PET polymer from KoSa, Germany, having an SV of 810),
10% masterbatch containing PET+1% silicon dioxide (Syloblock, Grace, Germany) and having an SV of 810, and
70% regrind consisting of 82% of in-process film trimmings and 18% of bottle recyclate (post-industrial, PET-A, Texplast, Germany) having an SV of 1200.

The film trimmings used had an SV of 750, giving a calculated mixture SV of 831 for the material used, prior to regrind. As a result of the extrusion step during regrind the SV of the mixture fell by about 20 units to an SV of 810, giving the regrind an SV approximately the same as that of the sum of the virgin raw materials.

Example 3

An ABA film 12 µm thick was produced as follows:
Outer layers (each 1 µm thick):
90% RT49 (clear PET polymer from KoSa, Germany, having an SV of 810),
10% masterbatch containing PET+1% silicon dioxide (Syloblock, Grace, Germany) and having an SV of 810.
Base layer (10 µm thick):
40% RT49 (clear PET polymer from KoSa, Germany, having an SV of 810), and
60% regrind consisting of 86% of in-process film trimmings and 14% of bottle recyclate (post-industrial, PET-A, Texplast, Germany) having an SV of 1200.

The film trimmings used had an SV of 770, giving a calculated mixture SV of 830 for the material used, prior to regrind. As a result of the extrusion step during regrind the SV of the mixture fell by about 20 units to an SV of 810, giving the regrind an SV approximately the same as that of the sum of the virgin raw materials.

Example 4

In accordance with example 2 a monofilm 4.5 µm thick was produced from:
20% RT49 (clear PET polymer from KoSa, Germany, having an SV of 810),
10% masterbatch containing PET+1% by weight silicon dioxide (Syloblock, Grace, Germany) and having an SV of 810, 57% regrind produced from in-process film trimmings, and
13% bottle recyclate (post-industrial, PET-A, Texplast, Germany) having an SV of 1200.

In this example as well bottle recyclate is introduced in order to raise the SV, but in this case not via the regrind circuit. As a result, the homogeneity of the polymer melt was somewhat reduced. This embodiment is therefore less preferred.

Comparative Example 1

Example 1 was repeated but now without the use of bottle recyclate. In order to obtain a film SV of 850 with otherwise unchanged properties, the following recipe was required:
81% M04 (clear PET polymer from KoSa, Germany, having an SV of 980),
9% masterbatch containing PET+4% by weight titanium dioxide and 3% by weight calcium carbonate and having an SV of 810, and
10% regrind consisting of in-process film trimmings.

The mixture SV of the recipe, in analogy to example 1, was approximately 950. The reduction in SV during drying and extrusion for film production was approximately 100 SV units, so that the SV of the film was 850.

The viscosities of virgin raw material, masterbatch and regrind were very different, which drastically impaired the homogeneity of the polymer melt.

At an overall yield of 64% in the film production process it was possible here to recycle only 10% of film trimmings, which made the film production operation uneconomic.

The properties of the films are set out in the table below:

TABLE

| Properties | | | E1 | E2 | E3 | E4 | CE1 |
|---|---|---|---|---|---|---|---|
| Thickness | | [μm] | 190 | 4.5 | 12 | 4.5 | 190 |
| Yellowness index | | | 17 | 1.2 | 1.2 | 1.2 | 17 |
| Transparency | | [%] | 59 | 91 | 91 | 91 | 59 |
| Haze | | [%] | — | 9 | 1.7 | 9 | — |
| Tensile strength | MD | [N/mm$^2$] | 200 | 310 | 250 | 310 | 205 |
| | TD | [N/mm$^2$] | 230 | 250 | 260 | 250 | 230 |
| Elongation at break | MD | [%] | 200 | 80 | 110 | 85 | 210 |
| | TD | [%] | 130 | 100 | 100 | 100 | 130 |
| Elasticity modulus | MD | [N/mm$^2$] | 3900 | 5100 | 4200 | 5100 | 4000 |
| | TD | [N/mm$^2$] | 4300 | 4300 | 5000 | 4250 | 4350 |
| Surface defects | | | none | none | none | none | none |
| Long-term thermal stability | | | good | good | good | good | good |
| Raw material cycle complete | | | yes | yes | yes | yes | no |
| Homogeneity of the polymer melt | | | good | good | good | adequate | good |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 102 51 675.8, filed Sep. 29, 2001 is incorporated herein by reference in its entirety.

As used herein and in the following claims, articles such as "the", "a" and "an" can connote the singular or plural.

All documents referred to herein are specifically incorporated herein by reference in their entireties.

We claim:

1. A process for producing a single-layer or multilayer film, said process comprising
   (i) extruding or coextruding a single crystallizable thermoplastic polymer and/or copolymer comprising a principal constituent and a secondary constituent;
   (ii) biaxially orienting the extrudate or co-extrudate;
   (iii) heat setting the biaxially oriented extrudate or co-extrudate,
   said process further comprising mixing the principal constituent with up to less than 50% by weight, based on the total weight of the thermoplastic, of the secondary constituent, said mixing step performed prior to or during said extrusion or coextrusion step,
   wherein
   the principal constituent has a standard viscosity SV (DCA) of from 600 to 1 000,
   the secondary constituent has a standard viscosity SV (DCA) of more than 900 to 1 500,
   the standard viscosity SV (DCA) of the secondary constituent is higher than that of the principal constituent by at least 100 units, and
   the secondary constituent is recycled polymer.

2. The process as claimed in claim 1, wherein the crystallizable thermoplastic used as principal constituent has a standard viscosity SV (DCA) of from 700 to 900.

3. The process as claimed in claim 1, wherein the secondary constituent has a standard viscosity SV (DCA) of from 1 000 to 1 400.

4. The process as claimed in claim 1, wherein the fraction of the secondary constituent is from 5 to 45% by weight based on the total weight of all crystallizable thermoplastics.

5. The process as claimed in claim 1, wherein the crystallizable thermoplastics is s polyester or copolyester.

6. The process as claimed in claim 5, wherein the secondary constituent contains less than 10% by weight of copolyesters.

7. The process as claimed in claim 5, wherein the polyester is a polycondensate of an aromatic dicarboxylic acid and an aliphatic diol having from 2 to 10 carbon atoms.

8. The process as claimed in claim 7, wherein the aromatic dicarboxylic acid is terephthalic acid, isophthalic acid and/or naphthalene-2,6-dicarboxylic acid.

9. The process as claimed in claim 7, wherein the aliphatic diol having from 2 to 10 carbon atoms is ethylene glycol.

10. The process as claimed in claim 1, wherein regrind arising during film production is recycled.

11. The process as claimed in claim 10, wherein the regrind is mixed with the secondary constituent.

12. The process as claimed in claim 11, wherein the arithmetic standard viscosity SV (DCA) of the mixture of regrind and secondary constituent is practically the same as that of the thermoplastic used as principal constituent.

13. The process as claimed in claim 1, wherein after orientation and heat setting the film has a thickness of from 0.9 to 500 μm.

14. The process as claimed in claim 1, wherein the film is UV-stabilized by addition of additives, made flame retardant, sealable, coated on one or both sides, stabilized with respect to hydrolysis, treated with antioxidants, chemically pretreated, corona-treated and/or flame-treated.

15. The process as claimed in claim 1, wherein the secondary constituent is added via a regrind circuit.

16. The process as claimed in claim 1, wherein the recycled polymer is plastic bottle recyclate.

17. A process for producing biaxially oriented single-layer or multilayer film comprising
   (i) extruding or coextruding a single crystallizable thermoplastic polymer and/or copolymer comprising a principal constituent, a secondary constituent and a third constituent;
   (ii) biaxially orienting the extrudate or co-extrudate;
   (iii) heat setting the biaxially oriented extrudate or co-extrudate, said process farther comprising mixing the principal constituent with up to less than 50% by weight, based on the total weight of the thermoplastic, of the secondary constituent, said mixing step performed prior to or during said extrusion or coextrusion step, wherein the principal constituent has a standard viscosity SV (DCA) of from 600 to 1000, the secondary constituent has a standard viscosity SV (DCA) of more than 900 to 1 500, the standard viscosity SV (DCA) of the secondary constituent is higher than that of the principal constituent by at least 100 units, and said third constituent is formed from recycled film, said third constituent having been subjected to an additional extrusion step during recycling, the amount of said second constituent determined via the formula:

$$SCA=((SV_{VR}+\Delta_R-SV_{TR})/(SV_{FL}-SV_{TR}))*100$$

wherein, SCA=secondary constituent amount,
   $SV_{VR}$=solution viscosity of primary constituent,
   $\Delta_R$=reduction in solution viscosity as a result of recycling extrusion,
   $SV_{TR}$=solution viscosity of the third constituent prior to recycling and
   $SV_{FL}$=solution viscosity of the secondary constituent.

* * * * *